Oct. 10, 1967  J. D. STACHIW ETAL  3,346,279
MECHANICAL COUPLING FOR GLASS AND CERAMIC ARTICLES
Filed April 13, 1965  2 Sheets-Sheet 1

INVENTORS.
Jaroslaw D. Stachiw
Phillip A. Vonada
BY
William D. Fosdick
AGENT

INVENTORS.
Jaroslaw D. Stachiw
Phillip A. Vonada
BY
William D. Fordick
AGENT

United States Patent Office 3,346,279
Patented Oct. 10, 1967

3,346,279
MECHANICAL COUPLING FOR GLASS AND
CERAMIC ARTICLES
Jaroslaw D. Stachiw, Oxnard, Calif., and Phillip A.
Vonada, State College, Pa., assignors to Corning Glass
Works, Corning, N.Y., a corporation of New York
Filed Apr. 13, 1965, Ser. No. 447,614
5 Claims. (Cl. 285—353)

ABSTRACT OF THE DISCLOSURE

A ceramic enclosure formed of two cup-shaped parts joined by a metal coupling assembly made up of ring members in threaded relationship with one another and holding the ceramic parts together by means of flanges on the parts.

This invention relates to a mechanical coupling particularly suitable for internally joining two ceramic articles.

It is an object of the invention to provide coupling means which may be applied internally to join two ceramic members in a manner which minimizes tensile stresses on the ceramic materials and which permits the composite article to exhibit a smooth and continuous outer surface.

Summary of the invention

The objects of the invention are accomplished by the provision of a coupling which comprises joined annular male and female coupling rings, each ring having threaded thereover a radially contractible ring which maintains an inwardly projecting flange on the ceramic member fixed between it and an outwardly extending flange on the respective male or female coupling ring. The male and female coupling rings are in threaded engagement. Where unusually high degrees of strength are necessary, inwardly and outwardly extneding flange portions are provided on the ceramic parts, and each flange is clamped between the rings.

Figure 1:
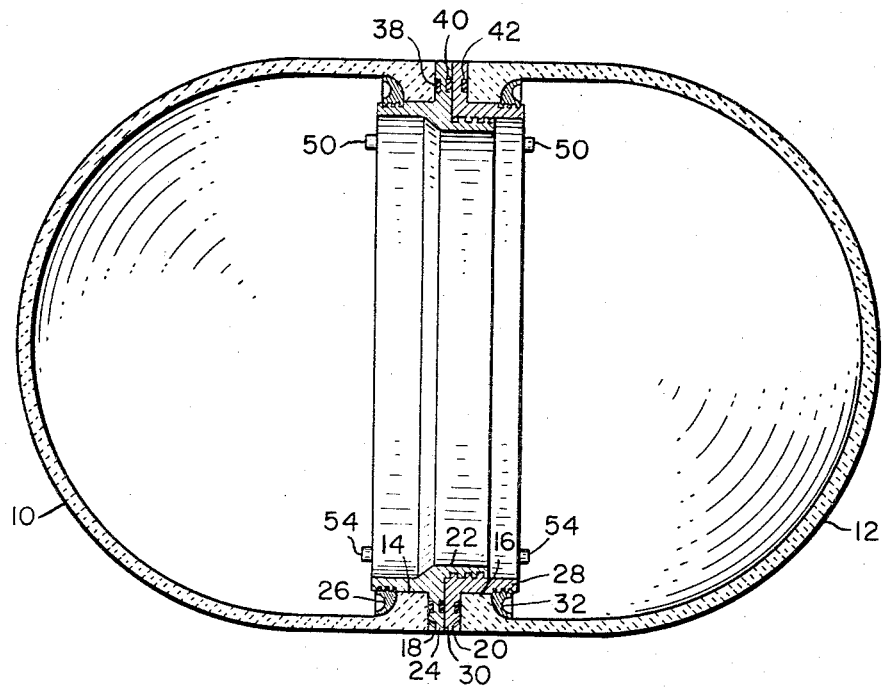
Figure 2:
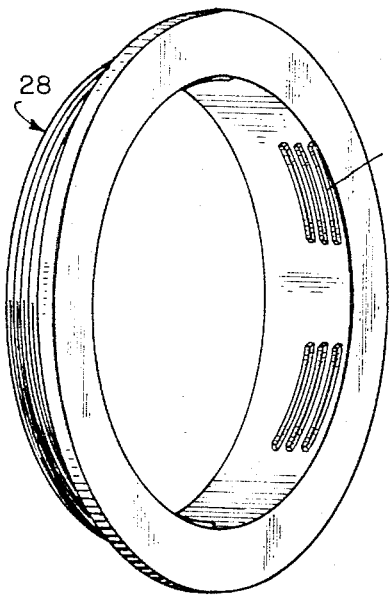
Figure 3:
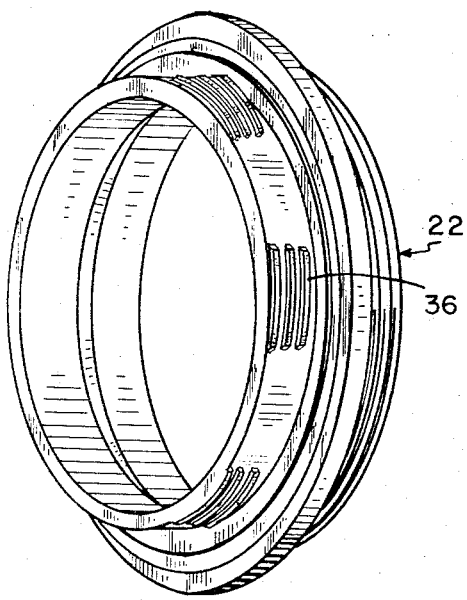
Figure 4:
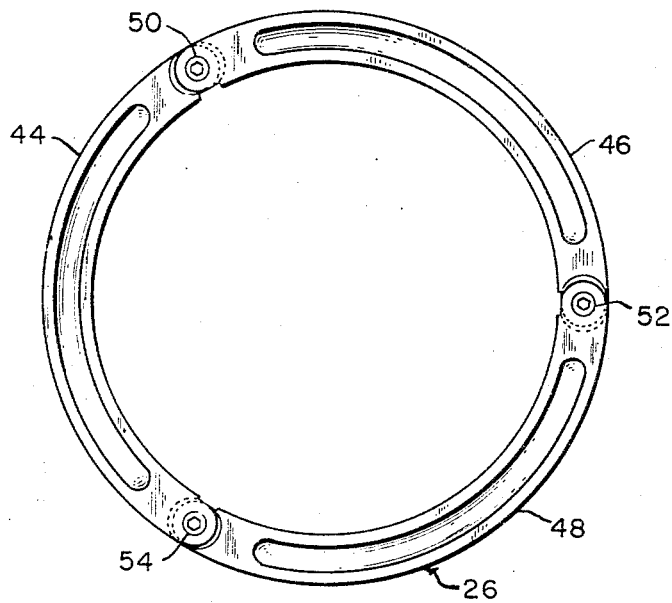
Figure 5:
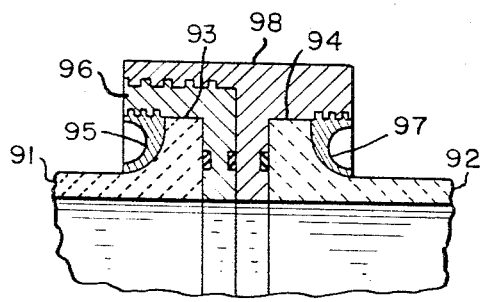
Figure 6:
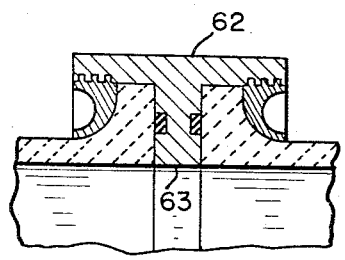
Figure 7:
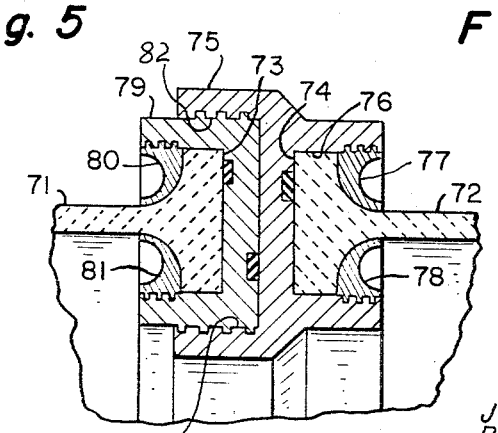

The invention will be described with reference to the accompanying drawing, in which:

FIGURE 1 is an axial sectional view of a ceramic diving instrumentation capsule joined by a coupling according to the present invention, FIGURE 2 is a perspective view of the female coupling ring employed in the invention, FIGURE 3 is a perspective view of the male coupling ring, FIGURE 4 is a plan view of a radially shrinkable locking ring employed in the coupling, and FIGURES 5-7 are fragmentary views of alternative forms of couplings according to the invention.

Referring to FIGURES 1-4, in the preferred embodiment of the invention, cup-shaped ceramic shell members 10 and 12 are provided with inwardly projecting flanges 14 and 16, in the vicinity of their annular edges 18 and 20, respectively. Annular male coupling ring 22 has an outwardly extending flange portion 24. Flange 14 is clamped between flange 24 and locking ring 26. Locking ring 26 is provided with internal threads, while the exterior surface of male ring 22 is provided with threads to permit the locking ring to be drawn thereover, thereby causing flange portion 24 and locking ring 26 to be drawn together about flange 14 as the locking ring is tightened. Female coupling ring 28 is provided with external flange portion 30. Flange 16 is similarly retained between flange 30 and locking ring 32, which is identical with locking ring 26. Female and male coupling rings 28 and 22 are joined by means of breach lock threads 34 and 36, illustrated in FIGURES 2 and 3. In order to provide resilient fluid-tight seals between the respective components, rubber O-ring gaskets 38, 40 and 42 are provided respectively between sealing edge 18 and flange 24, between flange 24 and flange 30, and between flange 30 and sealing edge 20.

As illustrated in FIGURE 4, each locking ring, such as ring 26, comprises three segments 44, 46 and 48 connected at their ends by bolts 50, 52 and 54 to form a continous ring. During assembly of the coupling, one of the bolts is removed, and the ring is collapsed by an amount sufficient to permit the ring to be inserted past the inwardly extending ceramic flange into the interior of the ceramic member. The ring is then expanded and rebolted together in the rigid form illustrated in FIGURE 4. After each locking ring has been inserted behind its respective ceramic flange in this manner, coupling rings 22 and 28 are threaded into the locking rings and the rings are rotated to draw them tightly against the ceramic flanges and to draw flanges 24 and 30 of the male and female coupling rings against edges 18 and 20, respectively. Subsequently, female coupling ring 28 is threaded over male coupling ring 22 to complete the enclosure.

As is well known, glasses and ceramics tend to fail in tension, while compressive stresses have substantially no destructive effects on them. An advantage of the present coupling is the fact that no part of the ceramic material is placed in tension, and the only forces exerted thereon are the compressive stresses on ceramic flanges 14 and 16. A further advantage of the coupling is the fact that, although all of the coupling components are contained substantially within the enclosure formed by the ceramic members, the only access to the interior of the shell which is required for the assembly of the coupling is through the openings defined by the sealing edges.

In alternative forms of the invention, locking rings 26 and 32, rather than being in segments, may be in the form of internally threaded flexible split rings. Such split rings are preferably employed only when a high degree of strength is not required in the coupling.

Although the male and female coupling rings are illustrated as joined by a breach-lock thread, such means may be replaced by continuous threads on the surfaces of the rings. In the appended claims the term "thread" and variations thereof are intended to include both such means.

Although ceramic flanges 14 and 16 have been illustrated as continuous rings, such form is not essential, and other flange forms may be utilized to retain the respective locking rings.

For uses where it is not necessary for the completed coupling to present a smooth external surface, the alternative embodiments of the invention illustrated in FIGURES 5–7 may be employed.

In FIGURE 5 there is illustrated a coupling similar to that of FIGURES 1–4, except that ceramic members 91 and 92 are provided with outwardly extending flanges 93 and 94, respectively. Flange 93 is maintained between locking ring 95 and an inwardly projecting flange on male coupling ring 96, while flange 94 is maintained between locking ring 97 and an inwardly extending flange on female coupling ring 98. In this embodiment, if the shapes of the ceramic members permit, locking rings 95 and 97 may be either radially shrinkable or rigid integral rings.

The embodiment illustrated in FIGURE 6 is similar to that illustrated in FIGURE 5, except that the male and female coupling rings are formed as an integral internally threaded ring 62 having a single inwardly projecting flange 63.

In FIGURE 7 there is illustrated a coupling having particular utility for applications where unusually high degrees of strength are necessary. Ceramic members 71 and 72 are provided with end flange portions 73 and 74, respectively, which project both outwardly and inwardly with respect to the ceramic body. Female coupling ring 75 is provided with an annular groove 76 having opposed threaded surface portions permitting locking rings 77 and 78 to maintain flange 74 within the annular groove. Male coupling ring 79 and locking rings 80 and 81 similarly grip flange 73. The coupling rings are connected by means of opposed threaded surfaces 82 and 83 of female coupling ring 75 in engagement with corresponding threaded surfaces of male coupling ring 79.

The term "ceramic" is used herein in its broad sense to include both crystalline materials and amorphous materials, such as glass.

Inasmuch as the foregoing description has been provided solely as that of a preferred embodiment of the invention, it is intended that the scope of the invention be limited only by the scope of the appended claims.

We claim:
1. A coupling joining two members along annular edges thereof, said coupling comprising
   a male coupling ring having a first external threaded surface portion,
   a female coupling ring having an internal threaded surface portion in engagement with said first external threaded surface portion of said male coupling ring,
   said male coupling ring having a second threaded external surface portion,
   said female coupling ring having a threaded external surface portion,
   each said coupling ring having an outwardly extending flange portion,
   each said member having an inwardly extending flange portion in the vicinity of its said edge,
   one said inwardly extending flange portion being retained between said outwardly extending flange portion of said male coupling ring and a radially contractible locking ring threaded over said second threaded external surface portion of said male coupling ring, and
   the other said inwardly projecting flange portion being retained between said outwardly extending flange portion of said female coupling ring and a radially contractible locking ring threaded over said external threaded portion of said female coupling ring.

2. A coupling according to claim 1 in which each said radially contractible ring comprises a plurality of rigid segments connected at their extremities.

3. A coupling joining two cup-shaped ceramic members along annular edges thereof, said coupling comprising
   a male coupling ring having a first external threaded surface portion,
   a female coupling ring having an internal threaded surface portion in engagement with said first external threaded surface portion of said male coupling ring,
   said male coupling ring having a second threaded external surface portion,
   said female coupling ring having a threaded external surface portion,
   each said coupling ring having an outwardly extending flange portion,
   each said ceramic member having an inwardly extending flange portion in the vicinity of its said edge,
   one said inwardly extending flange portion being restrained from movement in a direction away from said flange portion of said male coupling ring by a radially contractible locking ring threaded over said second external threaded surface portion of said male coupling ring, and
   the other said inwardly projecting flange portion being restrained from movement in a direction away from said flange portion of said female coupling ring by radially contractible locking ring threaded over said external threaded surface portion of said female coupling ring.

4. A coupling joining two ceramic members by means of a threaded male coupling ring attached to one said member and a female coupling ring threaded over said male coupling ring and attached to the other said member, and improved means for attaching said coupling rings to the respective said ceramic members, said means comprising
   an inwardly extending flange on each said ceramic member in the vicinity of the end thereof,
   external flange means on each said coupling ring cooperating with the outer edges of the respective said ceramic members to limit the depth to which said coupling rings may be inserted into said ceramic members,
   each said coupling ring having at its end located within its respective ceramic member a threaded external surface portion,
   each said coupling ring being retained within its respective member by an internally threaded radially contractible locking ring threaded over said threaded external surface portion of the respective coupling ring permitting said coupling ring to be drawn into the ceramic member until the said external flange means thereon contacts the end of said ceramic member and said inwardly extending flange of each said ceramic member is retained between said external flange means of its coupling ring and a locking ring.

5. A coupling joining two ceramic members along annular edges thereof, said coupling comprising
   a female coupling ring having a first annular groove having opposed first threaded surface portions,
   a male coupling ring having first threaded surface portions in engagement with said first threaded surface portions of said female coupling ring,
   each said ceramic member having an enlarged edge portion in the vicinity of said annular edges thereof,
   each said male and female coupling ring having a second annular groove formed therein having opposed second threaded surface portions,
   one said enlarged edge portion of said members being retained within said second annular groove in said male coupling ring by means of threaded locking rings in engagement with said second threaded surface portions of said male coupling ring, and
   the other said enlarged edge portion of said members being retained within said second annular groove in said female coupling ring by means of threaded locking rings in engagement with said second threaded surface portions of said female coupling ring.

References Cited

UNITED STATES PATENTS

| 431,816 | 7/1890 | Lomasney | 285—353 |
| 2,294,160 | 8/1942 | Crane et al. | |
| 2,952,378 | 9/1960 | Renslow | 220—5 |
| 3,096,678 | 7/1963 | Devine et al. | 85—33 X |
| 3,101,743 | 8/1963 | Hoke | 285—370 X |
| 3,122,962 | 3/1964 | DeAngelis | 85—1 |

CARL W. TOMLIN, *Primary Examiner.*

THOMAS F. CALLAGHAN, *Examiner.*